United States Patent [19]

Flesher et al.

[11] Patent Number: 4,720,346

[45] Date of Patent: Jan. 19, 1988

[54] FLOCCULATION PROCESSES

[75] Inventors: Peter Flesher; David Farrar; John R. Field, all of West Yorkshire, England

[73] Assignee: Allied Colloids Ltd., England

[21] Appl. No.: 855,509

[22] Filed: Apr. 23, 1986

[30] Foreign Application Priority Data

Apr. 25, 1985 [GB] United Kingdom ................. 8510496
Oct. 29, 1985 [GB] United Kingdom ................. 8526624

[51] Int. Cl.$^4$ .............................................. C02F 1/56
[52] U.S. Cl. ................................. 210/734; 210/732; 210/738; 523/322; 524/922
[58] Field of Search ............... 210/725, 727, 728, 730, 210/732–736, 738; 523/319, 322, 323; 524/922; 525/326.1, 329.4

[56] References Cited

U.S. PATENT DOCUMENTS

| | | | |
|---|---|---|---|
| 3,235,490 | 2/1966 | Goren | 210/734 |
| 3,380,947 | 4/1968 | Galgoczi et al. | 523/323 |
| 3,536,646 | 10/1970 | Hatch et al. | 523/322 |
| 3,624,019 | 11/1971 | Anderson et al. | 210/734 |
| 3,640,897 | 2/1972 | Restaino | 210/734 |
| 3,719,748 | 3/1973 | Manfroy et al. | 210/734 |
| 3,917,529 | 11/1975 | Madole et al. | 210/738 |
| 3,968,037 | 7/1976 | Morgan et al. | 210/734 |
| 3,977,971 | 8/1976 | Quinn et al. | 210/738 |
| 4,051,065 | 9/1977 | Venema | 422/261 |
| 4,113,688 | 9/1978 | Pearson | 524/922 |
| 4,172,066 | 10/1979 | Zweigle et al. | 525/329.4 |
| 4,382,864 | 5/1983 | Hashimoto et al. | 210/730 |
| 4,529,794 | 7/1985 | Sortwell et al. | 528/499 |

*Primary Examiner*—Peter Hruskoci
*Attorney, Agent, or Firm*—Ostrolenk, Faber, Gerb & Soffen

[57] ABSTRACT

When flocculating an aqueous suspension of suspended solids using a high molecular weight synthetic polymeric flocculant, the shear stability of the flocs is increased if the polymeric material includes polymeric particles of below 10 μm dry size. The flocculated solids can therefore be subjected to shear without increasing the amount of discrete suspended solids in the aqueous medium and generally they are subjected to shear by shearing the aqueous medium containing them, either before dewatering, generally on a centrifuge, piston press or belt press, or by continuously agitating them, for instance in a chemical reaction medium. The polymeric material is generally formed by mixing into water polymeric particles made by reverse phase or emulsion polymerization in the presence of added cross linking agent. Alternatively, particles insolubilized by insoluble monomer may be used. A reverse phase dispersion of water soluble polymer may be used if the particles remain undissolved, e.g. if they are added in the absence of an oil in water emulsifying agent.

24 Claims, 1 Drawing Figure

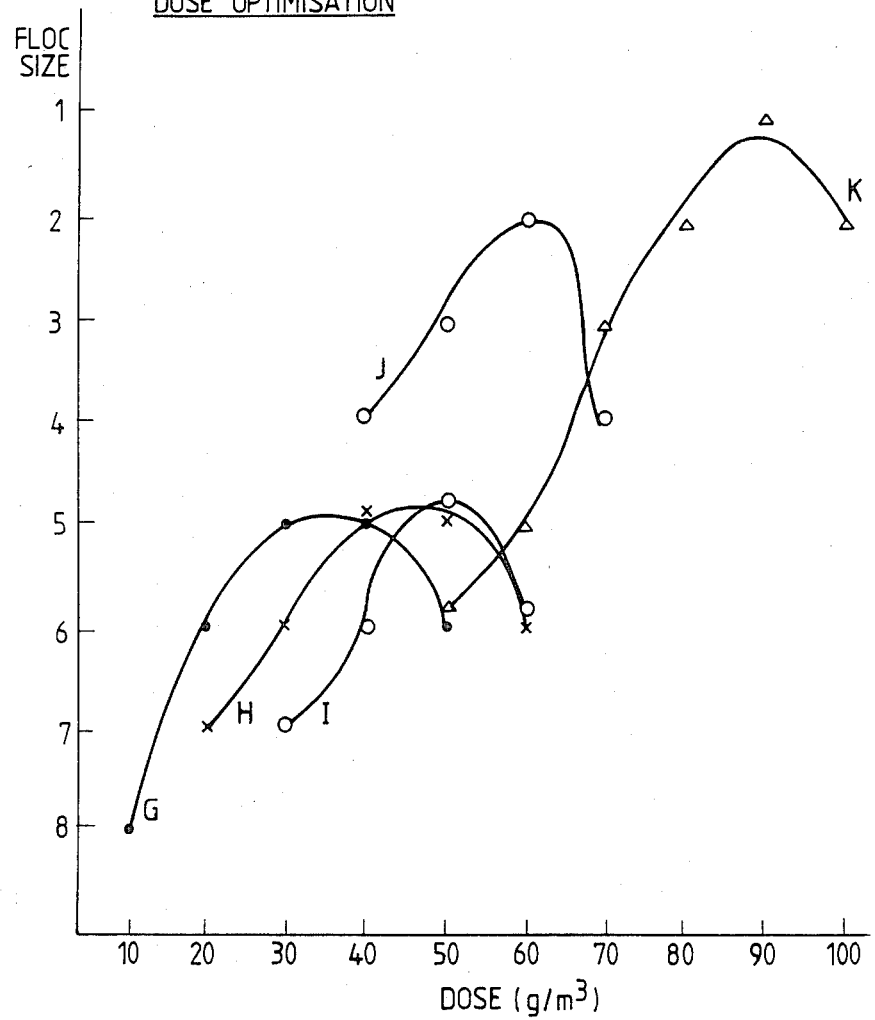

FLOCCULATION PROCESSES

When synthetic polymers of water soluble monomers or monomer blends were first introduced as flocculants, in the early to mid-1950's, maximum molecular weights were relatively low compared to the present day. The initial polymers typically had molecular weights well below 500,000 and thus were of a value comparable to the molecular weight now associated with coagulants, rather than high molecular weight flocculants. These low molecular weights were probably caused by the presence of chain transfer agents and other impurities in the monomer or polymerisation mixture.

It was recognised that the polymers had to be in solution and if the polymers were not, despite their low molecular weight, spontaneously soluble in water (for instance due to excessive cross linking) it was appreciated to be necessary to homogenise them so as to put them into solution. For instance Miller described in U.S. Pat. No. 3,021,269 ultrasonic degradation of a highly cross linked insoluble polymer gel "having almost infinite molecular weight" to render it water soluble as a result of severing the polymeric structure. The end products were always of relatively low molecular weight and the highest quoted molecular weight for the end product is 630,000 and the highest intrinsic viscosity (IV) 2.54 dl/g.

Similarly, Goren described in a 1954 patent application (published as U.S. Pat. No. 3,235,490) dispersing various polymer gels into water using a Waring Blendor. Many of the gels were cross linked spontaneously or by the addition of cross linking agent and the cross linking appears to have caused the formation of some wholly insoluble, non-swellable, polymer that settled out of solution. Solutions of the polymers were also subjected to homogenisation in a hand homogeniser and it was observed that the effect on agglomeration performance of this homogenisation is drastic, with most of the products being useless after homogenisation. Again, all the polymers were of very low molecular weight as is indicated by the fact that the highest specific viscosity (measured by a capilliary flow viscometer at 34° C. on a 0.5% solution in deionised water) is quoted as 0.77. This compares to values of well over 100, and usually over 1000, for modern high molecular weight flocculants.

Some polymers having molecular weights typical of those described by Miller and Goren can be used as coagulants, for instance for coagulating very fine suspended solids, e.g., for clearing turbidity or removing colour from aqueous solutions. For instance, typical modern polymer coagulants have a molecular weight of up to about 500,000. Typical polymer coagulants may be formed by reaction of epichlorhydrin with dimethylamine. Since the resultant linear product may have extremely low molecular weight, it is known to include ethylene diamine in order to increase molecular weight by cross linking without rendering the polymer insoluble.

Goren postulated that agglomeration involved electrostatic attraction followed by a sweeping action of a filamentary network of the cross linked polymer. This mechanism has come to be recognised as the classical mechanism of coagulating turbidity and colour, namely very fine suspended solids. Goren made his polymer by bulk polymerisation followed by comminution and showed that his aqueous compositions tended to be non-homogeneous, in that there was a tendency for insoluble polymer to precipitate from the solution. Goren warned against cross linking too much and indicated that the optimum was the level at which the polymer is still readily dispersible in water. Since Goren was postulating a sweeping action by filamentary molecular networks this indicates that his dispersibility had to be on a molecular scale, i.e., true solution. Goren warned that the agglomerating effect of the polymer can be destroyed by homogenising it (column 13 line 74).

In contrast to these low molecular weight polymer coagulants, modern flocculants (for flocculating suspended solids such as sewage) are linear polymers of very high molecular weight. Most have an intrinsic viscosity above 4 and often above 10. The polymers have to be linear since cross linking renders them ineffective and often insoluble, although trivial amounts of cross linking may exist without detracting from the polymer properties (see for instance U.S. Pat. No. 3,557,061 column 3 line 35).

Whether or not a high molecular weight polymer is suitable for use as a flocculant is determined in part by observing the rheology of aqueous compositions of the polymer. Satisfactory polymers give a "long" or "stringy" rheology. This is recognised in the art and can be demonstrated in that when a 1% stable homogeneous composition of the polymer in deionised water is formed by conventional techniques, such as by stirring using a slowly rotating stirrer followed by ageing, and a glass rod is manually pulled endwise out of the solution the rod draws a long thread of composition with it. The thread is generally at least 5 cm long and the polymer can then be described as having a rheology of 5 cm. Often the rheology is above 10 cm. If, in contrast to this, the polymer gives a "short" or "granular" rheology (i.e., in the above test the rod pulls substantially no thread, for instance below 5 cm and often below 2 cm, of composition), the polymer will be rejected and will not be used as a flocculant. Experience has shown that polymers giving this short rheology are unsatisfactory in conventional flocculation processes since it indicates a high degree of cross-linking and/or a low molecular weight. The short polymers can also be characterised as non-film forming, in that when an aqueous composition is dried it does not form a film.

Similarly the polymer is rejected if it has a large particle size and is cross linked sufficient to ensure that insoluble solid polymer does not go into stable suspension in the aqueous composition.

The stable homogeneous composition is stable in the sense that the polymer is in full equilibrium with the water, i.e., it has reached its ultimate degree of solution or swelling, for instance as a result of ageing for two hours or more. It is homogeneous in the sense that the polymer remains uniformly dispersed throughout the composition (usually in the total absence of dispersing agent although minor amounts may be present as a result of the manufacture of the polymer) with no tendency for material to precipitate from the composition on standing for a few days.

The unsuitability as flocculants of short rheology polymers (as defined above), and of polymers that do not go into stable suspension or solution are well understood in the art. Very high molecular weight, linear, truly dissolved polymers are preferred.

Certain high molecular weight polymers, for instance polymers of Mannich bases, have a tendency to cross link spontaneously and acquire a rather short or very short rheology or become totally insoluble. It frequently happens that high molecular weight polymers are produced which have rheology that is shorter than is desirable. Polymers of very short rheology (below 2 cm), or that are insoluble, are rejected. Polymers with longer, but still rather poor, rheology may be used under the same conditions as if they had the desired long rheology but this leads to poor performance properties.

In GB Pat. No. 1,579,007 it is alleged that high molecular weight cationic flocculants give optimum performance when the polymers have a cationicity value of at least 90% of the theoretical cationicity value.

Flocculant polymers may be made by reverse phase suspension or emulsion polymerisation to a very small particle size. Before use, the resultant emulsion is added to water, generally in the presence of oil-in-water emulsifying agent and usually with stirring, and allowed to form a true solution before use. Thus the system is always allowed to go to equilibrium (i.e., a stable homogeneous composition), often shown by attainment of maximum viscosity, before it is added to the suspension.

The linear, high molecular weight flocculant polymers are used by forming, with ageing, a true aqueous solution of the polymer and dosing this with minimum agitation into the suspension, followed by dewatering of the suspension. Optimum results require accurate dosing and the minimum of agitation during flocculation. If the dose is too low or too high flocculation is inferior. The optimum dose depends upon the content of the suspension and so variations in it, for instance variations in the metal content of industrial sewage effluent, can greatly affect performance. The flocs are very sensitive to shear and agitation, especially if the dosage is not at an optimum, is likely to redisperse the solids as discrete solids. This is a particular problem when the flocculated solids are to be dewatered under shear, for instance on a centrifuge, because if dosage and other conditions are not optimum the centrate is likely to have a high discrete solids content.

It would be desirable to provide a flocculation process in which the dosage of flocculant is less dose sensitive and the flocs are more stable to shear than with conventional dissolved high molecular weight flocculant polymers.

In the invention, an aqueous suspension of suspended solids is flocculated by adding a synthetic polymeric material to form an aqueous medium containing flocculated solids and the process is characterised in that at the time of addition to the suspension, the polymeric material has a specific viscosity above 10 (generally above 100), and comprises polymeric particles having a dry size of below 10 μm, the polymeric material is added in a floc stabilising amount, and the flocculated solids are subjected to shear in the presence of the aqueous medium substantially without increasing the amount of discrete suspended solids in the aqueous medium.

Thus the invention is based on the discovery that the shear stability of the flocs can be increased by initiating, and usually completing, flocculation while some or all of the polymeric material is in the form of small particles rather than a true solution. For optimum flocculation, the dosage of the polymer should usually be greater than the optimum amount used with fully dissolved polymers but the process is not so dose sensitive as with fully dissolved polymers.

The particulate material can be soluble. Thus a conventional reverse phase emulsion of soluble polymer can be mixed direct into the suspension or, usually, is diluted in the absence of oil-in-water emulsifier and/or with insufficient stirring or ageing to form a true solution, and is added to the suspension. This is in contrast to previous experience where the aqueous composition was always allowed to age to maximum viscosity (true solution) before use since conventional low shear flocculation (e.g., sedimentation) had shown this to be essential for satisfactory results.

It is often preferred that the polymeric material should comprise particulate insoluble polymer. This may be insoluble due to the inclusion of insolubilising monomers or due to the provision of a controlled degree of non-linearity in an otherwise soluble polymer. Commercially, the invention is best performed by making reproducibly a polymeric material having a controlled degree of non-linearity, which is used to flocculate an aqueous suspension and this is then subjected to shear without substantial redispersion of the solids to become discrete suspended solids. This procedure is in contrast to previous experience where non-linearity may have occurred by accident and the polymer was then either rejected as being useless or was used in either a conventional low shear process or was used in an inadequate amount in a high shear process, with consequential redispersion of solids.

The shear to which the flocculated solids are subjected may be applied only during dewatering of the solids but preferably the flocculated solids are subjected to shear by shearing the aqueous medium containing them. For instance instead of mixing the aqueous flocculant into the suspension in conventional gentle manner, with little or no agitation of the flocs, in the invention the aqueous medium is preferably sheared by stirring sufficient to reduce floc size. This is particularly desirable when the aqueous suspension is viscous, e.g., it has a solids content above 3% by weight for primary or digested sludges or about 1.5% for activated sludges. At these high solids contents, the flocs are likely to be very large, for instance above 5 cm (and often the solids may go into a substantially continuous floc) and the shear is preferably such as to break this large floc structure down into flocs typically having a size in the range 2 to 20 mm. Because of the particulate nature of the polymer, and appropriate choice of the amount of particulate polymer, this floc breakdown occurs without the amount of discrete suspended solids in the aqueous medium increasing substantially, or preferably at all, compared to the amount that is present if the suspension is not sheared.

After shearing, the medium may be dewatered. Dewatering may be by sedimentation or by drainage or vacuum filtration but a particular advantage of the invention is that the floc structure can be very effectively dewatered under shear, and in particular on a centrifuge, piston press or belt press, to give very high recovery of solids, and very low suspended solids in the filtrate.

Dewatering of flocculated solids can be conducted, especially at relatively low solids concentrations, under shear, e.g., on a centrifuge, even if the flocculated aqueous medium is not first subjected to shear, but generally less effective dewatering is obtained.

The improved floc structure obtainable in the invention, compared to the use of conventional dissolved flocculants, permits dewatering to an increased solids content, thereby for instance reducing the amount of energy required for incinerating a sewage filter cake.

The increased floc strength however is valuable in various other processes.

The flocs obtained in the process (preferably using insoluble polymer) can be continuously kept in suspension by agitation of the aqueous medium without any substantial increase in the discrete suspended solids in the aqueous medium. For instance, the polymeric material (usually as a stable homogeneous aqueous composition) may be added (optionally with applied shear) to an aqueous suspension whilst it is being agitated and this agitation may provide shear and may keep the resultant sheared flocculated solids in suspension. The continuous agitation may be continued for several hours and usually for at least a day or several days, without substantial floc breakdown. This is of value, especially when using anionic flocculants, for transporting inorganic or other solids in a fluid medium, for instance by pipeline or in any process in which agitation is applied for prolonged periods, e.g., in chemical or biochemical reactors.

The process is of particular value when the aqueous medium is a chemical reaction medium and the solids are a catalyst for the reaction, since we have surprisingly found that a stirred or otherwise agitated reactor can be operated for prolonged periods with the catalyst in the form of flocs. This facilitates the separation of the aqueous medium from the catalyst, for instance as the medium is withdrawn continuously or batchwise from the reactor. This process is of particular value in the catalytic hydrolysis of a nitrile to form an amide, for instance when the aqueous medium is an acrylonitrile hydrolysis reaction medium to form acrylamide. The catalyst is preferably a copper catalyst, for instance of reduced copper oxide or, preferably, Raney copper.

Another process where the shear resistance of the flocs is desirable is in the formation of paper and paper products such as board, since the processes of the invention permit improved dewatering of cellulosic and other suspensions. In conventional paper production, it is generally necessary to minimise the amount of shear to which the flocs are subjected and so in practice the flocculant is added at the end of the pulp flow line, as late as possible before the drainage or other dewatering stage. In the invention, however, it is possible, and frequently desirable, to add the flocculant (preferably an insoluble polymer) at an early stage in the pulp flow line so that the act of pumping the flocculated dispersion along the flow line towards the drainage or other dewatering stage involves the application of shear to the flocculated pulp, and this shear converts the flocs to medium or small size flocs substantially free of undesirable fines. A preferred process of the invention therefore comprises flocculating a cellulosic suspension by addition of the polymeric material, usually as a stable homogeneous aqueous composition and pumping the flocculated suspension along a flow line with sufficient shear to break down the flocs to smaller, shear stable, flocs and then dewatering the suspension by drainage or other suitable means. This process is of particular value when cationic starch is also added to the dispersion since the overall process then gives an exceedingly good combination of paper strength and retention and dewatering properties. For this process, the flocculant polymer is preferably an anionic polyacrylamide. Synergism appears to exist.

Another advantage of the invention is that the process is much less dose sensitive than when using truly dissolved flocculants and so there is much less risk of obtaining inferior performance due to under-dosing or over-dosing. Even after shearing the suspension, it is usually possibly to obtain floc size that is much greater than is obtainable using conventional dissolved flocculants. Because, at the optimum dose, the floc size is much greater than is available conventionally this means that the dose can be varied above or below the optimum whilst still obtaining improved results compared to those obtainable conventionally.

Although the invention can be used for flocculating a wide variety of aqueous inorganic suspensions and aqueous organic suspension, especially sewage, it is of particular value in the centrifugal dewatering of municipal sewage that includes a significant industrial component, especially that includes variable amounts of metal. Best results are generally obtained when the flocculated aqueous medium is vigorously stirred, so as to apply shear to the flocculated solids, before entering the bowl of the centrifuge.

The polymeric material can be dosed into the suspension in any convenient manner (e.g., a dispersion in oil could be metered carefully into the suspension) but is preferably added in the form of a dilute aqueous composition, typically having a concentration of 0.01 to 3%, generally 0.05 to 1%. It should preferably be a microdispersion. By this we mean that if a layer of this composition is allowed to dry, microscopic examination readily identifies discrete polymeric particles, optionally interconnected by a film of water soluble polymer. Often the composition does not form a film. The polymer particles must be below 10 $\mu$m dry size, preferably below 2 $\mu$m, but preferably swell, e.g., to at least twice their dry diameter, and often at least 5 times their dry diameter, in water.

When the polymer particles are insoluble, it is preferred for the aqueous composition to be a homogeneous stable composition as defined above although the polymer particles can go to equilibrium with the water in the flocculated suspension to some extent at least. If the polymer particles are soluble, then they must be added to the suspension before they dissolve and preferably initial flocculation is complete before they can dissolved.

In order that the particles have the desired small size, they are best prepared by emulsion or reverse phase polymerisation.

Although we believe it to be essential to include non-dissolved particles, it appears that dissolved polymeric material may also contribute to the invention and so the polymeric material that is added to the suspension may include also dissolved linear polymer. When the polymer particles are cross linked, it is generally preferred to provide this as a soluble component of the cross linked particles, so that upon dispersing the particles in the aqueous composition the particles swell and the soluble component dissolves into the composition. However it is also possible either to blend a dissolved polymer with a particulate (generally insoluble) polymer in the aqueous composition or to add these polymers sequentially to the aqueous suspension, the dissolved polymer generally being added first. When the mixture of dissolved and particulate polymers is made by blending polymers, the chosen polymers are usually co-ionic or one or both may be non-ionic, or they may be counter ionic. Usually the polymers are made from the same monomers, and often differ only in the degree of cross linking.

The amount of dissolved polymer is usually from 0 to 50%, preferably up to 20%, preferably at least 10%, by weight total polymer, the balance being particulate.

The particles may be wholly insoluble, non-swellable, polymer particles. For instance, they may be formed of wholly water insoluble monomers or, more preferably, a blend of water soluble and water insoluble monomers such that the polymer is insoluble in water (generally at both high and low pH values). Insolubility is often further increased by cross linking.

Preferably, however, the particles are formed of a monomer or monomer blend that is soluble in the aqueous composition and the particles are either soluble in the aqueous composition and are used before they dissolve, or, preferably, are cross linked sufficient that they are insoluble in but swollen by the aqueous composition. This cross linking (which may be chain branching) may be brought about by controlled spontaneous conditions such as heating or irradiation, provided the degree of chain branching or other cross linking is reproducible and controllable, but preferably is brought about by reaction of the monomer or monomer blend, or the final polymer, with a covalent or ionic cross linking agent.

Cross linked polymer can be made by cross linking a preformed linear water soluble polymer having a specific viscosity above 10 with a cross linking agent, e.g., by mixing an aqueous solution of the polymer with cross linking agent whilst stirring with sufficient force to form a homogeneous stable aqueous composition. If the stirring is inadequate, cross linked polymer will precipitate from the composition. If it is adequate, then the polymer will be broken up into sufficiently small particles, below 10 $\mu$m and preferably below 2 $\mu$m dry size, that the particles will remain in stable homogeneous dispersion. The cross linking agent for this purpose can be, for instance, formaldehyde or glyoxal or metal salts but preferably is a counterionic linear water soluble polymer having specific viscosity above 10. Preferably both polymers have specific viscosity above 100. By selecting appropriate amounts of polymers having anionic and cationic groups, it is possible to obtain a stable homogeneous aqueous composition of coprecipitated, or cross linked, polymer and, if desired, to leave an excess of a water soluble polymer of one ionic type.

The preferred way of making the aqueous composition is by mixing into water particles of polymeric material having dry size below 10, and most preferably below 2, $\mu$m and which have been made emulsion polymerisation or by reverse phase emulsion or suspension polymerisation of one or more monoethylenically unsaturated monomers. The polymer may be soluble but is preferably insoluble as a result of a controlled addition of cross-linking agent to the monomer or monomer blend, which is preferaby water soluble.

The monoethylenically unsaturated material may be contaminated with a small amount of cross-linking agent and the amount of additional cross-linking agent that is added will therefore be selected having regard to this fact. Preferably the monoethylenically unsaturated material is as free of cross-linking agent as is commercially possible, for instance containing cross-linking agent in an amount that gives cross linking or chain branching less than is given by ppm MBA (1 part methylene bis acrylamide per million parts monomer). The amount of MBA that is added is generally at least 0.1 or 0.2 ppm and below 100 ppm (based on monomer), generally 1 to 50 ppm. The precise amount will depend upon the polymerisation and other processing conditions. Instead of using MBA, cross-linking my be by equally effective amounts of other diethylenically unsaturated compounds such as ethylene glycol d-acrylate, diacrylamide, cyanomethylacrlate, vinyloxyethylacrylate or methacrylate and other means of cross linking, e.g., formaldehyde or glyoxal or metal salt addition. Preferably a water-soluble cross-linking agent is used.

The degree of non-linearity can additionally be controlled by the inclusion of chain transfer agents in the polymerisation mixture. Their use, in combination with cross-linking agent, will tend to promote chain branching rather than cross linking. Amounts may vary widely. For instance 1,000 to 5,000 ppm (based on monomer) of a moderate chain transfer agent such as isopropyl alcohol may be suitable whilst much lower amounts, typically 100 to 500 ppm, of more effective chain branching agents such as mercaptoethanol are useful. Often, however, adequate results are obtained by conducting polymerisation under conventional conditons, without deliberate addition of chain transfer agent, using commercially pure monoethylenically unsaturated monomer together with the specified amount of MBA or other cross-linking agent.

Instead of insolubilising the polymer by cross linking, it may be formed from an insoluble monomer, or a monomer blend containing sufficient insoluble monomer to insolubilise the polymer.

The monoethylenically unsaturated monomers may consist of one or more ionic monomers or a blend of ionic and non-ionic monomers. The monomers can be allyl monomers but are generally vinyl, preferably acrylic.

Suitable non-ionic monomers are acrylamide, methacrylamide, N-vinylmethylacetamide or formamide, vinyl acetate, vinyl pyrrolidone, methyl methacrylate or other acrylic (or other ethylenically unsaturated) ester or other water insoluble vinyl monomers such as styrene or acrylonitrile.

Suitable anionic monomers are sodium acrylate, methacrylate, itaconate, 2-acrylamido 2-methyl propane sulphonate, sulphopropyl acrylate or methacrylate or other water soluble forms of these or other polymerisable carboxylic or sulphonic acids. Sulphomethylated acrylamide, allyl sulphonate or sodium vinyl sulphonate, may be used.

Suitable cationic monomers are dialkylaminoalkyl acrylates and methacrylates, especially dialkylaminoethyl acrylate, and their quaternary or acid salts, and dialkylaminoalkylacrylamides or methacrylamides and their quaternary or acid salts for instance methacrylamidopropyl trimethyl ammonium chloride and Mannich products, such as quaternised dialkylaminomethylacrylamides. Alkyl groups are generally $C_{1-4}$ alkyl.

The monomers can contain hydrophobic groups, e.g., as described in EP No. 0172723A2, for instance on page 10 thereof. If the monomer is to impart insolubility to the polymer, the ethoxy chain should be short or absent, i.e., n=0. The allyl ether monomers are especially preferred.

The polymerisation conditions are preferably such that the polymer has, if uncross linked, a conventional flocculant high molecular weight of 5 million to 30 million and an intrinsic viscosity of above 4, preferably above 6, e.g., up to 15 or 20 dl/g. If the polymer is cross linked, it is preferably polymerised such that it would have such molecular weight if it had been made in the absence of cross linking agent. However cross linking will reduce the IV but the shearing may then cause the IV to increase, as explained below. The specific viscosity of the polymer, measured as defined above, is generally above 100, preferably above 500 and frequently above 1000.

The particle size in the emulsion or reverse phase polymerisation mixture may be controlled by the degree of shear applied to the monomers and by the possible presence of emulsifying agent. Emulsion polymerisation may be utilised when polymerising, for instance, water insoluble monomers such as acrylic esters or water insoluble but acid soluble monomers such as amines (the resultant polymer being distributed into acidic aqueous composition) but generally reverse phase emulsion or suspension polymerisation is utilised when the monomer or monomer blend is soluble in water. The aqueous monomer is emulsified into a suitable non-aqueous liquid, generally in the presence of a water in oil emulsifier, generally in an amount below the critical micell concentration. Emulsifiers, stabilisers, non-aqueous liquids and other reverse phase polymerisation materials and process details are described in, for instance, EP No. 0126528. The polymer particles may be dehydrated, for instance by subjecting the dispersion to azeotropic distillation.

The liquid product resulting from the reverse phase polymerisation or emulsion polymerisation is generally used as such, without separation of the polymer particles, but if desired dried polymer particles may be separated from the dispersion in known manner. Because these dry particles will be very dusty, they should preferably be formed into pellets that will disintegrate upon addition to water.

The polymer-in-oil emulsion that results from reverse phase polymerisation may be added to water to form the aqueous composition (or to the suspension) in the presence of oil-in-water emulsifier in conventional manner. However when the polymer is water-soluble, it is preferred to make the addition in the absence of the emulsifier so that the rate of solution is slower. The reverse phase emulsion is preferably dehydrated.

The polymerisation conditions are preferably such that the polymer particles resulting from the polymerisation have the desired controlled degree of solubility but it is possible to produce polymer particles that are too highly cross linked and then to subject this polymer to sufficient shear to restore it to a desired, controlled, degree of cross linking. This shear may be applied to the dispersion in which the polymer particles are formed or, preferably, to the aqueous homogeneous composition. For instance when such a solution has short rheology, the mixing may convert it to long rheology. These processes are described in our application Ser. No. 855,519 filed even date herewith.

When the polymeric material is cross linked and cationic, and in particular when it is a copolymer of acrylamide with at least 5%, and preferably at least 10%, by weight dialkylamino alkyl acrylate (generally as acid addition or quaternary ammonium salt), the degree of non-linearity is preferably such that the polymer has an ionic regain (IR) of at least 15%. IR is calculated as $(x-y)/x \times 100$ where x is the ionicity measured after applying standard shear and y is the ionicity of the polymer before applying standard shear.

These values are best determined by forming a 1% composition of the polymer is deionised water, allowing this to age for 2 hours and then further diluting it o 0.1% active polymer. The ionicity of the polymer y is measured by Colloid Titration as described by Kock-Light Laboratories Limited in their publication 4/77 KLCD-1. (Alternatively the method described in BP No. 1,579,007 could possibly be used to determine y.) The ionicity after shear, x is determined by measuring by the same technique the ionicity of the solution after subjecting it to standard shear.

The shear is best applied to 200 ml of the solution in a substantially cylindrical pot having a diameter of about 8 cm and provided in its base with a rotatable blade about 6 cm in diameter, one arm of the blade pointing upwards by about 45 degrees and the other downwards by about 45 degrees. The blade is about 1 mm thick and is rotated at 16,500 rpm in the base of the pot for 10 minutes. These conditions are best provided by the use of a Moulinex homogeniser but other satisfactory conditions can be provided using kitchen blenders such as Kenwood, Hamilton Beach, Iona or Osterizer blenders or a Waring Blendor.

In practice the precise conditions of shear are relatively unimportant since, provided the degree of shear is of the same order of magnitude as specified, it will be found that IR is not greatly affected by quite large changes in the amount, for instance the duration, of shear, whereas at lower amounts of shear (for instance 1 minute at 16,500 rpm) IR is greatly affected by small changes in shear. Conveniently, therefore, the value of x is determined at the time when, with a high speed blade, further shear provides little or no further change in ionicity. This generally requires shearing for 10 minutes, but sometimes longer periods, e.g., up to 30 minutes with cooling, may be desired.

It should be understood that the defined shear is not shear that is applied to the polymer solution or to the flocculated suspension during the flocculation process of the invention but is instead shear that is applied as an analytical technique to permit definition of the properties of the polymers that may be used in the invention.

When using cross-linked polymeric material, polymers having IR of 15% have a relatively low degree of non-linearity whilst those having IR 90% have a high degree of non-linearity. It is generally preferred for IR to be below 80%; preferably below 70%, and usually below 60%. If IR is too low, the invention may give inadequate benefit compared to conventional polymers and preferably IR is above 20%. Best results are generally obtained at above 25%, preferably 30 to 60%.

It is desirable for the intrinsic viscosity to be as high as possible but satisfactory values of IV reduce as the value of IR increases. Generally $IV=(100-IR)/a$ where a is below 20 and is generally below 15 but is usually above 4. Generally a is in the range 6 to 14. Throughout this specification IV is measured at 25° C. in 3M NaCl according to the method described in Encyclopedia of Polymer Science & Technology, Editors Mark and Gaylord, published John Wiley & Sons, 1971, Volume 14 pages 717-740.

If the polymer is cross-linked, IV can be increased by the application of shear (as is also described in application Ser. No. 855,519 and the polymeric material is preferably one whose IV can be above 4, and preferably above 6, after the application of shear such as the standard shear described above.

The aqueous composition of the polymeric material may be combined with the suspension that is to be flocculated by conventional methods of blending but, as described above, shear is generally applied sufficient to reduce floc size.

The amount of polymer that has to be added for optimum floc stability is often greater than the amounts conventionally used with highly soluble polymeric flocculants, usually at least 10% and often at least 20% greater than the amount that would be required when using a conventional, highly water soluble, substantially linear polymer. Suitable doses are in the range 0.01 to 3%, often 0.5 to 3%, by weight polymer based on dry solids.

The amount that is required for adequate floc stability can be found by routine experimentation and, for any particular flocculation process, polymer type and degree of shear, the amount of polymer will depend upon the degree of swelling or solution of the polymeric material, e.g., the degree of cross-linking. Generally the optimum amount increases with increasing amounts of cross linking.

A convenient way for determining the optimum floc stabilising amount is to determine the dose that gives maximum floc size when the polymeric material is sheared into the suspension and the suspension is left to settle. The optimum is the dosage that gives maximum floc size after shear and in the invention, the dose that is applied is generally from 50 to 150, preferably 70 to 110% of this optimum dose.

A particularly preferred process according to the invention comprises providing a homogeneous dilute aqueous composition of a reverse phase polymerised, non-film-forming, cross linked, acrylamide copolymer with dialkylaminoalkyl(meth)acrylate (as acid salt or quaternary salt) having a dry particle size below 10 μm (preferably below 2 μm), IR above 15 and $IV=(10-0-IR)/a$ where a is from 6 to 14, adding this composition to sewage sludge in an amount of 50 to 150% of the amount required for maximum floc size after shearing, subjecting the blended mixture to the shearing to reduce floc size substantially without increasing the amount of suspended solids, and dewatering the resultant aqueous medium on a centrifuge, piston press or belt press.

BRIEF DESCRIPTION OF THE DRAWING

The accompanying drawing is a graph of the results in Example 2.

The following are some examples.

In every example, the polymeric material had a specific viscosity well above 100 and a dry particle size below 2 μm and an aqueous composition of the polymeric material gave a discontinuous, particulate film.

EXAMPLE 1

A copolymer of 58% acrylamide and 42% dimethylaminoethylacrylate quaternised with methyl chloride (DMAEA.MeCl) and having intrinsic viscosity 10 dl/g was prepared by reverse phase polymerisation, to give a particle size below 2 μm, followed by azeotropic distillation. It was labelled Polymer AC and was provided as a 50% dispersion of polyme in oil. The monomers used were commercially pure monomers. Polymer BC was formed by the same method but in the presence of 10 ppm MBA, and had intrinsic viscosity 6.6 dl/g.

Each dispersion was mixed with water and allowed to age. A chosen amount of the resultant aqueous composition was stirred with an activated sludge for 25 seconds using Triton WRC Standard Shear Test Stirrer and Timer Type 133/131 fitted with a marine blade to give extra shear. This resulted in flocculaton and in reduction of the floc size.

The flocculated suspension was dewatered on a laboratory centrifuge consisting of a cylindrical solid bowl closed at its base and open at its top but with an inwardly extending lip around its periphery. The bowl ran at 2,000 rpm and was, at this speed, filled with water (400 ml). 400 ml of the flocculated sewage sludge was fed gradually into the bowl while spinning. Some of the solid was trapped in the bowl whilst the remainder passed out in the overflow, as the centrate. Since the flocculate suspension is accelerated, in a very short period of time, to 2,000 rpm, this centrifugal system of dewatering applies very high shear to the flocculated suspension. Best results are those wherein there is maximum retention of solids in the bowl, with least solids content in the centrifugate.

The dose of $g/m^3$ and the suspended solids in the centrate (mg/l) when treated with each of the polymers AC and BC are shown in Table 1a.

TABLE 1a

| Dose | AC | BC |
|------|------|------|
| 20 | 1148 | 1400 |
| 30 | 1088 | 660 |
| 50 | 667 | 368 |
| 60 | 1863 | 244 |
| 70 | 2227 | 342 |
| 80 | 2670 | 402 |
| 100 | 4627 | 626 |
| 120 | 5372 | 726 |

The cationicity regain of the polymers was recorded for 10 minutes shearing, as in the definition of ionicity regain given above, and also for 1 and 5 minutes shearing, and the values are shown in Table 1b.

TABLE 1b

| Polymer | Shearing Time | | |
|---------|-------|-------|--------|
|         | 1 min | 5 min | 10 min |
| AC | 5% | 9% | 9% |
| BC | 21% | 42% | 42% |

It is apparent that the optimum dose for linear polymer AC, having a regain of 9%, is at 50 $g/m^3$ whilst the optimum dose for non-linear polymer BC, having IR 42%, is at 60 $g/m^3$ but that polymer BC gives better results and its optimum results are obtained over a much wider range, 30 to about 120 $g/m^3$, than is permissible with polymer AC, i.e., the non-linear polymer is less dose sensitive.

EXAMPLE 2

Five polymers were prepared by the same general process as in Example 1 using the same monomers, but with differing amounts of MBA. The polymers, the amounts of MBA in ppm based on monomer, the intrinsic viscosity and the IR values are shown in Table 2.

TABLE 2

| Product | MBA | IV | IR |
|---------|-----|------|-----|
| GC | 0 | 14.1 | 6.7 |
| HC | 2.5 | 11.1 | 17 |
| IC | 5.0 | 10.2 | 23 |
| JC | 10.0 | 6.7 | 42 |
| KC | 25.0 | 3.4 | 59 |

Solutions of the above products together with that of product AC were used to treat 100 ml samples of activated sludge over a dosage range. A visual assessment of floc size was carried out after the shearing in the Triton stirrer for 25 seconds. Using a scale of 1–8 where 1 represents the largest and 8 the smallest floc, the results of the assessment were plotted as shown in the attached graph. In this way, the optimum dose for each product was obtained.

Activated sludge samples were then treated at the optimum dose with each product. 200 ml portions of the treated sludge were then fed through the centrifuge as in Example 1, when the following results were obtained.

TABLE 4

| Product | Optimum Dose (mg/l) | Centrate Suspended Solids (mg/l) |
|---|---|---|
| GC | 35 | 824 |
| HC | 45 | 660 |
| IC | 50 | 612 |
| JC | 60 | 190 |
| KC | 90 | 60 |

This clearly demonstrates the improved results in high shear dewatering when using an increased (double) dosage of a polymer that is cros-linked to such an extent that IR is above about 30%.

EXAMPLE 3

A rane of copolymers of 60 wt% DMAEA.MeCl and 40 wt% acrylamide were prepared as 50% dispersions in oil as in Example 1 using different amounts of MBA and commercially pure monomers.

All products were evaluated on a raw mixed primary activated sewage sludge as aids to gravity and compression filtration. This involved first stirring the sludge with 0.1% w/v solutions of the copolymers at various doses, in order to optimise the dose by observing the influence of cross linking on floc size. Further samples of sludge were then treated at the optimum dose using periods of stirring, which represented different levels of shear and allowed for the optimum development of the floc. The stirring was by a Bosch electric drill unit fitted with a marine bladed stirrer. Dewatering was then carried out by allowing 180 seconds of free drainage, on a filter wire retained in a Buchner funnel, followed by 180 seconds of drainage under compression. The filter cakes were weighed, dried and reweighed, in order to provide a measure of dry solids content.

The results obtained were as in Table 3.

TABLE 3

| Product | MBA ppm | Dose (mg/l) | Stirring Time (seconds) | Cake Solids (%) | IR % |
|---|---|---|---|---|---|
| LC | 0 | 140 | 15 | 16.0 | 14.2 |
| MC | 2 | 200 | 45 | 17.1 | 27.6 |
| NC | 4 | 220 | 45 | 17.4 | 38.0 |
| OC | 8 | 300 | 75 | 20.0 | 50.8 |

EXAMPLE 4

Products PC and QC were made in the same way, and from the monomer proportions, as products GC and IC in Example 2. Additionally, a product RC was prepared at the same cationic monomer content but with 63 ppm MBA. These three additional copolymers were collected together with copolymers JC and KC of Example 2 to form a range which increased in ionicity regain and decreased in intrinsic viscosities as shown in Table 4a.

TABLE 4a

| Product | MBA (ppm) | I.V. (dl/g) | I.R. (%) |
|---|---|---|---|
| PC | 0 | 14.3 | 0.5 |
| QC | 5.0 | 8.4 | 28.0 |
| JC | 10.0 | 6.7 | 42.0 |
| KC | 25.0 | 3.8 | 59.0 |
| RC | 63.0 | — | 71.0 |

The above products were evaluated in the laboratory on sewage sludges in order to determine the dose giving optimum technical performance, as described in Example 2. The chosen optimum amount was then mixed into 200 ml sewage sludge in a 400 ml beaker using a Heidolph Type 741.00 unit fitted with a turbine stirrer for 3 minutes on a number 2 setting. The flocculated sludge was then dewatered, in simulation of belt pressing, using a piston press. This involved increasing the pressure through the cycle as shown in Table 4b.

TABLE 4b

| Period of Pressing (minutes) | Pressure (bar) |
|---|---|
| 0–1 | 0.7 |
| 1–2 | 1.4 |
| 2–3 | 2.1 |
| 3–6 | 2.8 |

The process was conducted with two types of sewage.

On completion of the pressing cycle, the cakes were removed for dry solids determination. The results are shown in Table 4c.

TABLE 4c

| Sludge Type | Product | Dose (mg/l) | Cake Solid (%) |
|---|---|---|---|
| Digested primary/ activated | PC | 250 | 24.8 |
| | QC | 325 | 27.6 |
| | JC | 375 | 27.1 |
| | KC | 650 | 28.1 |
| | RC | 1000 | 27.7 |
| As above but containing 1.0 M of added NaCl | PC | 40 | 19.9 |
| | QC | 60 | 22.5 |
| | JC | 80 | 23.8 |
| | KC | 150 | 26.3 |
| | RC | 275 | 29.6 |

As can be seen from the above results, the trend is one of increasing optimum dose and cake solids as the MBA content is increased.

EXAMPLE 5

Tests were carried out in simulation of belt pressing as described in Example 4 using products PC and JC of Table 4a at doses equal to the optimum and also doses above and below it. Shear was applied by pouring the flocculated sludge 10 times from one beaker to another. The digested primary/activated sludge used as test substrate was from an alternative source to that of Example 4.

TABLE 5

| Product | Dose (mg/l) | Cake Solids (%) |
|---|---|---|
| PC | 125 | 10.1 |
| PC | 150 | 11.0 |
| PC | 175 | 10.8 |
| JC | 300 | 13.4 |
| JC | 325 | 14.2 |
| JC | 350 | 13.4 |

The results demonstrate how the order of cake solids varies about the optimum dose.

EXAMPLE 6

Tests were carried out in simulation of high pressure filtration (filter pressing). This involved dewatering a raw primary/activated sludge, on the laboratory piston press at pressures of up to 7 bar. As in the previous example, products PC and JC were evaluated at doses equal to and above and below the previously determined optimum, after shearing the flocculated suspension by pouring from one beaker to another 15 times.

Results were as shown in Table 6.

TABLE 6

| Product | Dose (mg/l) | Cake Solids (%) |
|---|---|---|
| PC | 100 | 14.7 |
| PC | 125 | 15.1 |
| PC | 150 | 13.8 |
| JC | 225 | 15.9 |
| JC | 250 | 16.4 |
| JC | 275 | 16.1 |

Once again, the results demonstrate how the order of cake solids varies about the optimum dose.

EXAMPLE 7

Three copolymers having ratios of 80 wt% DMAEA MeCl to 20 wt% acrylamide were prepared as reverse phase suspension polymerisation dispersions. The three products contained 0, 4 and 8 ppm of MBA on weight of monomer and were identified as SC, TC and UC. Portions of products SC and UC were mixed together to provide 50:50 and 75:25 blends respectively (SC:UC).

The two blends and the original samples were each added to a digested Primary/Activated sewage sludge over a dosage range and the flocculated product stirred for 25 seconds on the Triton mixer of Example 1. A visual assessment of floc size served to indicate the optimum dose for each treatment.

Further sludge samples, treated at the optimum dose of each product and blend were evaluated on the laboratory centrifuge as described in Example 1 after vigorous stirring of the flocculated aqueous medium with the Triton mixer. Details of the products and results obtained were as in Table 7.

TABLE 7

| Product | M.B.A. (ppm) | Ionicity Regain (%) | Optimum Dose (g/m³) | Centrate Solids (mg/l) |
|---|---|---|---|---|
| SC | 0 | 10.0 | 100 | 2272 |
| TC | 4 | 26.5 | 150 | 1080 |
| UC | 8 | 52.2 | 225 | 340 |
| SC:UC-50:50 | (4) | 34.4 | 125 | 1236 |
| SC:UC-25:75 | (2) | 22.5 | 125 | 1846 |

It will be observed that the enhanced performance provided by cross linked flocculants can be obtained by blending linear and cross linking flocculants to intermediate levels of cross linking.

EXAMPLE 8

A similar exercise to that described in the previous example was carried out on copolymers having 60:40 wt% DMAEA MeCL:Acrylamide composition. Details of the products and results obtained are given in Table 8.

TABLE 8

| Product | M.B.A. (ppm) | Ionicity Regain (%) | Optimum Dose (g/m³) | Centrate Solids (mg/l) |
|---|---|---|---|---|
| VC | 0 | 14.2 | 100 | 1856 |
| WC | 2 | 27.6 | 150 | 1378 |
| XC | 4 | 38.0 | 175 | 398 |
| YC | 8 | 50.9 | 225 | 274 |
| 50:50: VC:YC | (4) | 33.2 | 150 | 534 |
| 75:25: VC:YC | (2) | 25.3 | 150 | 1416 |

EXAMPLE 9

A solid grade commercially available cationic copolymer having composition 42 wt% DMAEA MeCl and 38 wt% acrylamide and two commercially available anionic copolymers having composition 10 wt% sodium acrylate: 80 wt% acrylamide and 20 wt% sodium acrylate: 80 wt% acrylamide, identified as products, ZC, JA and KA respectively, were made up as 0.2% solutions. The solution of the cationic product ZC was rapidly mixed (using a Heidolph stirrer) in turn with the solutions of products JA and KA.

When mixing was insufficiently rapid, a precipitate settled.

The three compositions were evaluated on an activated sewage sludge using the laboratory centrifuge as described in Example 1, after vigorous stirring using the Triton mixer for 25 seconds. The results are in Table 9.

TABLE 9

| Dose (g/m³) | Centrate Suspended Solids (mg/l) | | |
|---|---|---|---|
| | Solution ZC | Solution 80 ZC:20 KA | Solution 80 ZC:20 JA |
| 30 | 1000 | 1114 | 1260 |
| 40 | 632 | 888 | 1116 |
| 50 | 668 | 808 | 1048 |
| 60 | 684 | 408 | 580 |
| 80 | 1248 | 476 | 460 |
| 100 | 1820 | 510 | 320 |
| 125 | — | 668 | 834 |
| 150 | 1872 | 896 | 1348 |

It can be seen that blends of anionic and cationic solutions made from solid grade products are capable of producing a similar effect to that obtained using performed cross linked polymers.

EXAMPLE 10

Using a similar procedure to that described in the previous example, solutions of product ZC were rapidly mixed with varying volumes of solution KA to provide blends containing 5, 10, 20 and 30% of KA.

Each solution was used to treat an activated sludge over a dosage range and visual assessment of floc size used to indicate the optimum dose.

Further activated sludge samples were then treated with the optimum dose of each solution before being dewatered on the laboratory centrifuge.

The following results are in Table 10.

TABLE 10

| Treatment | Optimum Dose range (mg/l) | Average Suspended Solids of Centrate |
|---|---|---|
| ZC | 40–60 | 1456 |
| 5:95 KA:ZC | 50–80 | 1400 |
| 10:90 KA:ZC | 50–80 | 1176 |
| 20:80 KA:ZC | 60–100 | 1077 |

TABLE 10-continued

| Treatment | Optimum Dose range (mg/l) | Average Suspended Solids of Centrate |
|---|---|---|
| 30:70 KA:ZC | 100–140 | 835 |

EXAMPLE 11

Settlement tests were carried out to compare product AC of Example 1 and product KC of Example 2 in regard to their ability to flocculate Raney copper catalyst.

In carrying out these tests, 0.05% wt/v solutions of flocculant were added to 500 ml portions of 5% w/v Raney copper slurry in deionised, de-oxygenated water at room temperature. These were placed in a cylinder inverter and subjected to inversion to promote mixing after addition of the flocculant solution. Subsequent inversions could be carried out, following those required for mixing, in order to test the floc strength. The quality of the floc formed was, at all stages, measured in terms of the settlement rate of the flocculated slurry, since large flocs invariably produce faster rates of settlement. Settlement rate was measured as the time required to produce a visible mud-line in the flocculated slurry.

Tests were first carried out to determine the optimum dose of flocculant with the results shown in Table 11a.

TABLE 11a

| Flocculant Dose | Settlement Time (seconds) | |
|---|---|---|
| (mg/l) | Product AC | Product KC |
| 0 | 54.8 | 54.8 |
| 1 | 25.1 | 41.8 |
| 10 | 10.4 | 7.8 |
| 20 | 6.5 | 3.0 |
| 30 | 4.7 | 1.6 |
| 40 | 5.4 | 1.0 |
| 50 | 4.5 | 1.7 |
| 60 | 4.6 | 1.5 |
| 70 | 4.6 | 1.5 |
| 80 | 10.6 | 1.4 |
| 90 | 15.4 | 1.9 |
| 100 | 20.7 | 1.2 |
| 140 | | 1.7 |
| 180 | | 1.8 |
| 220 | | 1.4 |
| 260 | | 2.1 |
| 300 | | 1.6 |
| 340 | | 1.7 |

From the above it can be seen that the optimum dose for each product is 30 mg/l. It is, however, apparent that the overdosing effect observed for product AC is not apparent with product KC.

Further samples were treated at the optimum dose level and subjected to inversions with settlement time being measured for each of the flocculated suspensions after equal numbers of inversions.

Results were as shown in Table 11b.

TABLE 11b

| | Settlement Time (seconds) | |
|---|---|---|
| Number of Inversions | Product AC | Product KC |
| 3 | 6.3 | 1.7 |
| 6 | 6.5 | 1.3 |
| 9 | 6.0 | 0.9 |
| 12 | 6.7 | 1.2 |
| 15 | 7.8 | 1.0 |
| 18 | 8.1 | 1.1 |
| 21 | 8.8 | 1.1 |
| 24 | 10.5 | 0.9 |
| 27 | 11.3 | 0.9 |
| 30 | 12.6 | 1.4 |
| 33 | 14.4 | 1.3 |
| 36 | 15.9 | 1.3 |
| 39 | 17.3 | 1.7 |
| 42 | 18.9 | 1.3 |
| 45 | 20.8 | 1.2 |
| 60 | | 1.5 |
| 90 | | 1.7 |
| 111 | | 1.6 |
| 141 | | 2.0 |
| 171 | | 2.2 |
| 186 | | 2.4 |

From the results, it can be seen that Raney copper catalyst treated with product KC manifests an significantly more stable floc than that treated with product AC. The flocculated catalyst gave substantially the same yield of acrylamide, when used in a conventional process for the hydrolysis of acrylonitrile, as the corresponding unflocculated catalyst but gave much easier separation of the reaction liquor from the catalyst.

EXAMPLE 12

A range of anionic copolymers, having composition 40 wt% sodium acrylate, 60 wt% acrylamide, were prepared from monomer mixes containing different amounts of methylene bis acrylamide, by reverse phase suspension polymerisation. The degree of structure incorporated into each copolymer increased in proportion to the amount of MBA in the monomer as indicated by depression of the intrinsic viscosity.

The above products were evaluated on coal fines in simulation of dewatering by belt filtration. This involved treating 400 cm$^3$ portions of the coal fines with a solution of the flocculant followed by stirring for 120 seconds to apply shear and induce flocculation. The stirring was by a Heidolph stirrer on setting 2 using a gate stirrer in a 600 cm$^3$ beaker. The flocculated fines were then transferred to the belt press simulator and dewatered under the influence of pressure which was gradually increased to 1.6 bar. On completion of the dewatering cycle, the cake was removed for dry solids determination and calculation of the yield.

The MBA content, IV, results for cake solids and yield at the optimum dose established for each product are shown in Table 12.

TABLE 12

| Product | MBA content (ppm of polymer) | I.V. (dl/g) | Dose (mg/l) | Cake Solids (%) | Yield (%) |
|---|---|---|---|---|---|
| AA | 0 | 18.5 | 100 | 61.5 | 85.2 |
| BA | 2.71 | 14.3 | 150 | 60.0 | 85.8 |
| CA | 6.76 | 11.3 | 400 | 60.8 | 90.0 |
| DA | 13.53 | 6.6 | 500 | 57.8 | 86.6 |
| EA | 20.29 | 5.5 | 600 | 59.8 | 92.6 |
| FA | 27.06 | 2.7 | 800 | 59.8 | 92.4 |
| GA | 40.53 | 3.1 | 1200 | 58.6 | 93.7 |
| HA | 67.60 | — | 1600 | 59.1 | 89.4 |
| IA | 135.30 | — | 1600 | 59.7 | 84.9 |

It can be seen that as the degree of cross linking increases the general trend is for improvement in yield. Products HA and IA demonstrate decreasing yield either because they are too cross linked to be effective or the optimum dose has not been attained.

EXAMPLE 13

Products AA, CA, EA and GA of Example 12 were used to treat coal tailings over a range of doses and the flocculated suspension was tested on the centrifuge as described in Example 1. The dose, in mg/l, at which optimum centrate quality was obtained and the suspended solids in the centrate (%) are shown below; each result being the average of two tests, one employing 30 seconds of mixing, the other 120 seconds mixing to induce flocculation. The mixing was as in Example 12.

| Polymer | Optimum Dose (mg/l) | Suspended Solids in Centrate (%) |
|---|---|---|
| A.A. | 113 | 1.38 |
| A.C. | 163 | 0.78 |
| A.E. | 250 | 0.55 |
| A.G. | 550 | 0.42 |

It can be seen that as the degree of structure in the polymer is increased (as indicated by the depressed I.V.), the optimum dose and effectiveness increase.

EXAMPLE 14

An emulsion in oil of polymeric particles below 2 $\mu m$ in size is made by reverse phase polymerisation of a blend of 40% acrylamide and 60% MeCl diethylaminoethyl acrylate and methylene bis acrylamide in an amount sufficient to raise IR from near zero to between 35 and 40.

The emulsion is added to water with stirring and allowed to age to provide a stable composition.

The composition is then added at a polymer dose of about 6 kg/t total solids to an aqueous suspension that is flowing towards a commercial sewage dewatering centrifuge, the treated suspension is sheared in a Inline Mixer to reduce floc size without redispersing discrete solids, and the sheared product is then dewatered in the centrifuge. The solids content of the centrate is typically below 0.2% (0% is ideal) and the degree of separation is above 98% (100% is ideal). When the process is repeated using uncross linked polymer, the corresponding values are typically above 1% and below 75%.

EXAMPLE 15

A 1 liter resin pot containing 250 g water, 1 g Ethylan HA (non-ionic surfactant from Lankro Chemicals Ltd.) 0.1 g V50 (polymerisation initiator from Wako Pure Chemical Industries Ltd.) and 0.1 g Tetralon A (sequestering agent manufactured by Allied Colloids Ltd.) and bubbled with $N_2$ was placed in a constant temperature water bath at 75° C.

A monomer feed was prepared by mixing 120 g of dimethyl amino ethyl methacrylate and 80 g of methyl methacrylate which was then added to a monomer feed vessel. An aqueous feed was prepared by mixing 200 g water, 9 g Ethylan HA, 0.3 g V50 and 0.1 g Tetralon A which was then added to an aqueous feed vessel.

The contents of each vessel were then pumped separately, but in constant proportion, to a premixing chamber containing a high speed stirrer before being added to the resin pot. The pump speed was adjusted such that the total volume of monomer and aqueous feed was added over a period of 90 minutes. After the addition was complete, the same was held at 75° C. for a period of 1 hour before being cooled.

The product of this example, designated Polymer A, was a 30% active polymer in water. Two further samples were prepared in the manner so described but containing 500 ppm and 5000 ppm of alkyl methacylate in turn. These samples were designated Polymers B and C respectively.

The products prepared as described were then diluted and acidified as the full HCl salt to 2% active in water. Performance tests were then carried out using the sheared CST technique as described previously on a sample of digested primary/activated sludge. The results obtained are given in the following Table:

| Product | Cross-linking amount (ppm) | Polymer Dose (g · m³)/Shearing time (secs) | | | | | | | |
|---|---|---|---|---|---|---|---|---|---|
| | | 250/25 | 400/25 | 500/25 | 600/25 | 700/25 | 800/25 | 900/25 | 1000/25 |
| Polymer A | 0 | 129 | 32 | 19 | 17 | 23 | 28 | 31 | 47 |
| Polymer B | 500 | 249 | 58 | 25 | 19 | 15 | 19 | 24 | 53 |
| Polymer C | 5000 | 388 | 140 | 78 | 67 | 35 | 25 | 16 | 17 |

The results demonstrated that for these emulsion polymerised products, Polymer A (having no cross-linking agent) is susceptible to a significant over-dosing effect above its optimum dose but with Polymers B and C, the over-dosing effect becomes less apparent as the level of cross-linking agent increases.

EXAMPLE 16

Four solutions were prepared from a sample of 50:50 DMAEAq MeCl:ACM copolymer (originally prepared as a 50% w/w dispersion in oil), as follows:

Sample 1: 1% w/w active polymer with activator
Sample 2: 0.1% w/w active polymer with activator
Sample 3: 1% w/w active polymer without activator
Sample 4: 0.1 w/w active polymer without activator All solutions were prepared in deionised water using 10 seconds low shear mixing followed by 2 hours tumbling. The activator, when present, was an oil-in-water emulsifier.

Each sample was then used to condition aliquots of digested sewage sludge at a range of dosages, the performance being assessed in each case by means of CST time.

A sample of the same material, prepared as above (with activator) 24 hours earlier was included as a control.

The samples containing activator (1 and 2) and the control exhibited optimum performance at 80–100 g/m³ and at higher doses, an over-dosing effect was seen.

The unactivated samples (3 and 4) had optimum performance at a much higher dosage level (200 g/m³) and did not exhibit any over-dosing effect, and at their optimum dose gave a lower CST (better results) than the CST at the optimum dose of the control and samples 1 and 2.

EXAMPLE 17

When products prepared by reverse phase polymerisation, as dispersions in oil, are made up directly at low solution concentrations then, by virtue of the imposed low activator concentration in the solution, activation tends to be incomplete. This results in the polymer going only partially into solution. On using such partial solutions, it has been demonstrated that improved technical performance can be obtained.

In accordance with the above, solutions of product CA were made up at concentrations of 1, 0.2 and 0.1% w/v active polymer. Each of the solutions was subjected to ionicity regain determination with those at 1 and 0.2% being diluted to 0.1% immediately prior to determination. In similar manner, the solutions were used to treat an activated sewage sludge prior to centrifugation, as described in example 1, with the 1 and 0.2% concentrations being diluted to 0.1% immediately prior to treatment.

Results were as follows.

| Original Solution Concentration (%) | IR (%) | Optimum Dose (mg/l) | Suspended Solids in Centrate (mg/l) |
|---|---|---|---|
| 1.0 | 18 | 70 | 1,600 |
| 0.2 | 30 | 100 | 850 |
| 0.1 | 60 | 125 | 270 |

What is claimed is:

1. A process for flocculating an aqueous suspension of suspended solids comprising, adding to the suspension a flocculating amount of a synthetic polymeric flocculant material to form thereby an aqueous medium containing flocculated suspended solids and in which the said polymeric flocculant material at the time of addition to the suspension has a specific viscosity (measured by a capilliary flow viscometer at 34° C. on a 0.5% solution in deionised water) above 10 and comprises polymeric particles that have a dry size of below 10 $\mu$m, the polymeric material is added in a floc stabilising amount, and the flocculant solids are subjected to shear in the presence of the aqueous medium substantially without increasing the amount of suspended solids in the aqueous medium to reduce the size and increase the shear stability of said flocculated suspended solids.

2. A process according to claim 1 in which the aqueous medium is then dewatered.

3. A process according to claim 1 in which the flocculated solids are separated from the aqueous medium by dewatering selected from centrifuge, piston press and belt press dewatering.

4. A process according to claim 1 in which the flocculated solids are continuously kept in suspension by agitation of the aqueous medium.

5. A process according to claim 4 in which the flocculated solids are catalyst particles and the aqueous medium is a chemical reaction medium.

6. A process according to claim 1 in which the polymeric particles are of water insoluble water swellable polymer.

7. A process according to claim 6 in which the particles are of water insoluble, water-swellable polymer and the polymeric material is made by mixing an aqueous solution of linear water soluble polymer having specific viscosity above 10 with a dissolved cross linking agent whilst stirring with sufficient force to form a homogeneous aqueous composition.

8. A process according to claim 7 in which the cross linking agent is a counterionic polymer having specific viscosity above 10.

9. A process according to claim 1 in which the particles are of water insoluble, water-swellable polymer and are cross linked and have been formed by polymerisation in the presence of added cross-linking agent of a monomer or monomer blend that is soluble in the aqueous composition.

10. A process according to claim 9 in which the cross linking agent is a diethylenically unsaturated monomer and the amount of cross linking agent is from 1 to 100 ppm based on the polymerisable monomers.

11. A process according to claim 9 in which the polymeric material has ionic regain greater than 15% and is cationic wherein said ionic regain is calculated as $(x-y)/x \times 100$ where x is the ionicity measured after applying standard shear and y is the ionicity of the polymer before applying standard shear.

12. A process according to claim 9 in which the polymeric material has ionic regain of 25 to 70% and is cationic.

13. A process according to claim 9 in which the polymeric material has ionic regain of 25 to 70% and is a cationic copolymer of acrylamide with at least 5 mole percent dialkylaminoalkyl acrylate (including acid addition and quaternary ammonium salts thereof).

14. A process according to claim 9 in which the polymer has intrinsic viscosity of $(100-\text{ionic regain})/a$ dl/g where a is from 6 to 14.

15. A process according to claim 1 in which the polymeric particles are of water soluble polymer and are added to the suspension under conditions such that they have not fully dissolved.

16. A process according to claim 15 in which the particles are added to water while in the form of a polymer-in-oil dispersion in the absence of an oil-in-water emulsifier.

17. A process according to claim 1 in which the particles have been formed by emulsion polymerisation or reverse phase polymerisation.

18. A process according to claim 1 in which the polymeric material is selected from materials that have intrinsic viscosity above 4 and materials that can have intrinsic viscosity above 4 after shearing.

19. A process according to claim 1 in which a 1% aqueous composition of the polymeric material that is added to the suspension gives, if cast as a film on a glass plate and dried, a discontinuous film of discrete swellable particles having a size of below 10 $\mu$m.

20. A process according to claim 1 in which the amount of polymeric material is from 50 to 150% of the amount that gives maximum floc size after application of shear to the aqueous medium.

21. A process according to claim 1 and which comprises providing a homogeneous dilute aqueous composition of a reverse phase polymerised, non film-forming, acrylamide copolymer with dialkylaminoalkyl (meth) acrylate acid salt or quaternary salt having a dry particle size below 2 $\mu$m, ionic regain (IR) above 15 wherein said ionic regain is calculated as $(x-y)/x \times 100$ where x is the ionicity measured after applying standard shear and y is the ionicity of the polymer before applying standard shear and intrinsic viscosity $=(100-\text{IR})/a$ where a is from 6 to 14, adding this composition to sewage sludge in an amount of 50 to 150% of the amount required for maximum floc size after shearing, subjecting the blended mixture to the shearing to reduce floc size substantially without increasing the amount of discrete suspended solids, and dewatering the resultant aqueous medium on a centrifuge, piston press or belt press.

22. A process according to claim 1 in which the polymeric flocculant is a polymer formed from one or more ethylenically unsaturated monomers selected from the group consisting of acrylamide, methacrylamide, N-vinyl methyl acetamide, N-vinyl methyl formamide, vinyl acetate, vinyl pyrollidone, (meth)acrylic esters, styrene, acrylonitrile, water soluble forms of carboxylic or sulphonic acids selected from (meth) acrylic acid, itaconic acid and 2-acrylamido methyl propane sulphonic acid, sulpho methylated acrylamide, allylsulphonate, sodium vinyl sulphonate, dialkylaminoalkyl(meth)acrylates and their quaternary or acid salts, and dialkylaminoalkyl(meth)acrylamides and their quaternary or acid salts.

23. A process according to claim 1 in which the polymeric material is a polymer formed by polymerisation of a monomer selected from the group consisting of water soluble acrylic acid salt, water soluble 2-acrylamido methyl propane sulphonic acid salt, dialkylaminoalkyl(meth)acrylates and their quaternary or acid salts, and dialkylaminoalkyl(meth)acrylamides and their quaternary or acid salts, and blends of any of said monomers with acrylamide.

24. A process in which an aqueous suspension of suspended solids is flocculated by adding to the suspension a flocculating amount of a synthetic polymeric flocculant material to form thereby an aqueous medium containing flocculated suspended solids and in which the said polymeric flocculant material at the time of addition to said suspension has a specific viscosity (measured by a capilliary flow viscometer at 34° C. on a 0.5% soluton in deionized water) above 10, and is formed by polymerization of a monomer selected from the group consisting of water soluble acrylic acid salt, water soluble 2-acrylamido methyl propane sulphonic acid salt, dialkylaminoalkyl (meth) acrylates and their quaternary or acid addition salts, and dialkylaminoalkyl (meth) acrylamides and their quaternary or acid addition salts, and blends of any such monomer with acrylamide and has been made by polymerization in the presence of added diethylenically unsaturated cross linking agent in an amount of from 1 to 100 ppm and is in the form of polymeric particles that are water insoluble but water swellable and that have a dry size of below 10 $\mu$m, the aqueous medium containing the flocculated solids is subjected to shear substantially without increasing the amount of suspended solids in the aqueous medium to reduce the size and increase the shear stability of said flocculated suspended solids, the amount of the polymeric material that is added to the suspension is from 50 to 150% of the amount that gives maximum floc size after the application of shear to the aqueous medium, and the aqueous medium is then dewatered on a centrifuge, piston press or belt press.

* * * * *

UNITED STATES PATENT AND TRADEMARK OFFICE
CERTIFICATE OF CORRECTION

PATENT NO. : 4,720,346

DATED : January 19, 1988

INVENTOR(S) : Peter Flesher, David Farrar and John R. Field

It is certified that error appears in the above-identified patent and that said Letters Patent is hereby corrected as shown below:

Column 21:

Claim 1, line 42, "flocculant solids" should read --flocculated solids--.

Signed and Sealed this

Ninth Day of November, 1993

Attest:

BRUCE LEHMAN

Attesting Officer

Commissioner of Patents and Trademarks